United States Patent Office 3,518,623
Patented June 30, 1970

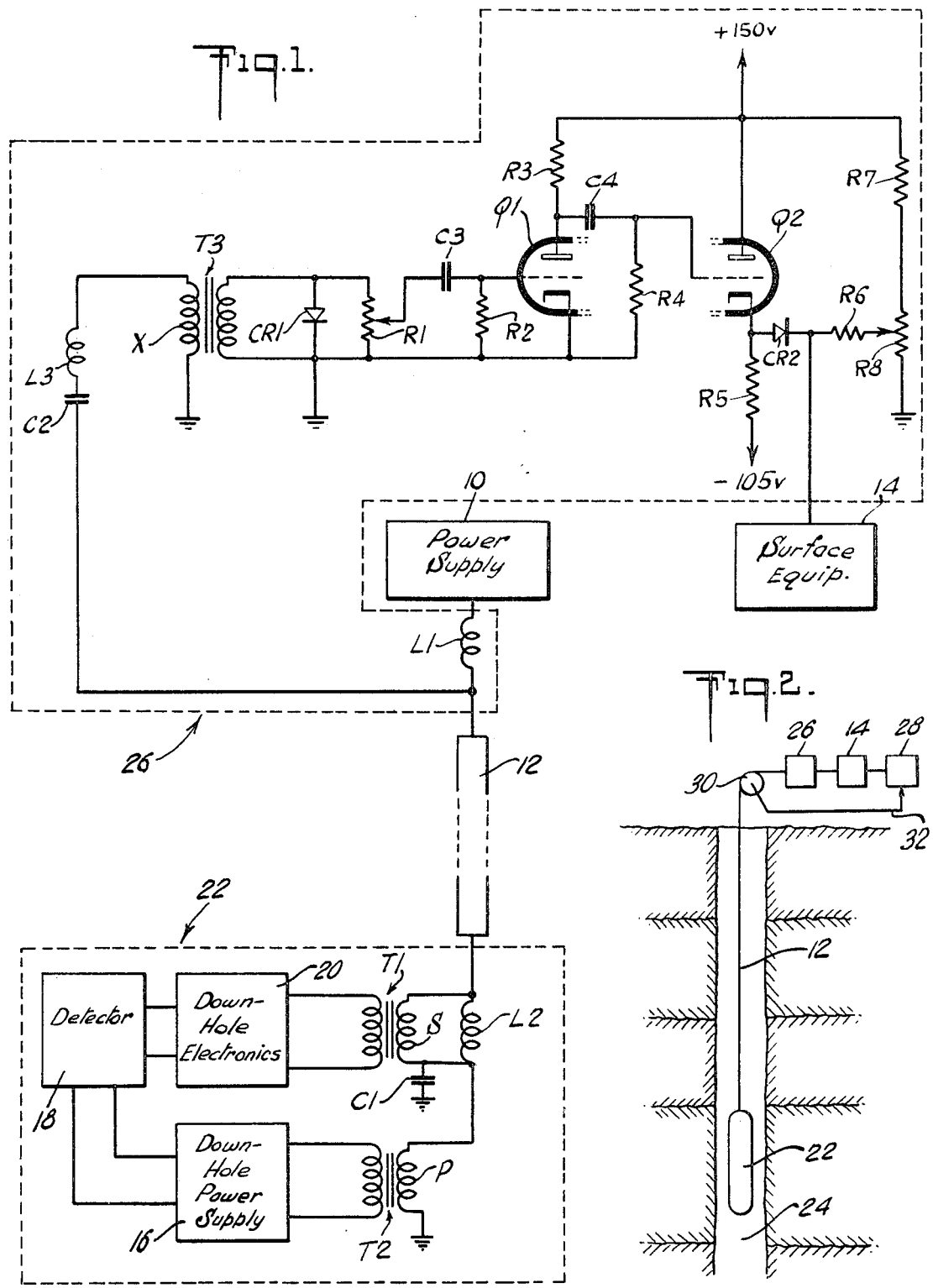

3,518,623
WELL LOGGING SYSTEM
Obie M. Langford, Houston, Tex., assignor to Texaco Inc., New York, N.Y., a corporation of Delaware
Filed Apr. 24, 1967, Ser. No. 633,248
Int. Cl. G01v 1/22, 1/40, 5/00
U.S. Cl. 340—18                                   1 Claim

ABSTRACT OF THE DISCLOSURE

A system for logging a borehole traversing earth formations wherein a logging tool, or sonde, connected to an end of an electrical cable traverses the borehole; the tool, or sonde, containing nuclear or radioactivity logging apparatus such as, for example, a scintillation detector including a photomultiplier and associated circuitry for generating output information signals representing at least one parameter (e.g., nature of subsurface formations or strata) within the traversed portion of the borehole. A 60 cycle AC power supply at the earth's surface sends power down the cable to provide the input power necessary for driving the logging apparatus. Concurrently, the information signals are sent up through the cable in superimposed relation with the AC power supply voltages. At the earth's surface there is also provided a network, or circuitry, which presents a low impedance to the information signals and a high impedance to the AC power supply voltages. Afterward, the isolated information signals are amplified, clipped and delivered to signal, or pulse, analyzing equipment in correlative relationship to the depth of the sonde in the borehole.

BACKGROUND OF THE INVENTION

This invention pertains to well logging systems of the type in which a logging tool, or sonde, connected to an end of an electrical cable, or transmission line, traverses a borehole in the earth and sends information signals, representative of at least one borehole parameter, upwardly through the cable to the earth's surface for interpretation correlative with the depth of the sonde in the borehole; and, more particularly, to a logging system wherein low frequency AC power supply voltages generated at the earth's surface and transmitted down the cable to the sonde and the superimposed information signals being transmitted up the cable are separated at the earth's surface.

During the nuclear logging of a well borehole there is encountered the problems of separating 60 cycle AC power supply voltages from the information pulses; the latter mentioned pulses being of a relatively short duration. The 60 cycle AC supply causes a ringing pulse to be produced which, with time, decreases in amplitude and increases in pulse width. Heretofore, in an attempt to damp the ringing pulse while preserving and extracting the information pulse the negative part of the ringing pulse was clipped and only the positive overshoots thereof were used. However, this method was found to be unsatisfactory when amplitude discrimination was used because some of the overshoots are as large as the small amplitude information pulses.

SUMMARY OF THE INVENTION

One object of the invention is to provide a well borehole logging system including a surface powered logging tool which as it traverses the borehole sends information signals to the surface where said information signals can be separated from the surface-originated power voltages and correlated with the depth of the logging tool in the borehole.

Another object of the invention is to isolate and thereby retain information bearing voltage pulses of relatively short duration and low amplitude from power supply voltages of relatively longer duration and higher amplitude.

Briefly, in accordance with one illustrative embodiment of the invention there is provided isolation circuitry coupled to the receiving end of a well logging cable, the receiving end of the cable being located at the earth's surface. Also coupled to the cable's receiving end is a 60 cycle AC power supply, the power supply and isolation circuitry being connected in parallel to the receiving end of the cable. The isolation circuitry includes an input filter section which presents a high impedance to the 60 cycle AC power supply voltage but a relatively low impedance to the low amplitude short duration information pulses which are transmitted through the cable from a logging tool, or sonde, deep within the well borehole to the receiving end of the cable. Subsequently, the information pulses are amplified in a step-up pulse transformer which has a diode connected across the secondary thereof to damp transformer ringing. Afterward, the amplified pulses are fed to an adjustable potentiometer which serves as a saturation preventing input section for two stages of amplification; first stage being ordinary amplification and the second stage being a cathode follower amplifier. From the output of the cathode follower amplifier the pulses are processed through a clipping network which rejects noise and reflection pulses. From the clipping network the pulses are fed to other surface equipment including a pulse height analyzer. Means are also provided for correlating said information pulses received with the depth of the sonde in the borehole.

Other objects as well as the many advantages and features of the invention will become apparent from the following description when considered in conjunction with the accompanying drawing.

BRIEF DESCRIPTION OF THE DRAWINGS

In FIG. 1 there is illustrated a schematic diagram of the system including the isolation circuit according to the invention.

In FIG. 2 there is shown a schematic diagram of the overall logging system according to the invention.

DESCRIPTION OF THE PREFERRED EMBODIMENT

As shown, a 60 cycle AC power supply 10 located at the surface is connected to the receiving end of a logging cable 12 through an inductor L1. The cable 12 is a coaxial cable. Electrical energy from the power supply 10 is transmitted downwardly through the coaxial cable 12 through another inductor L2 to the primary side P of a transformed T2 which supplies 60 cycle AC power to various components located in nuclear well logging apparatus located deep in the well borehole. The inductor L2 is connected as shown with respect to the secondary winding S of another transformer T1. The transformer T1 couples information pulses to the cable 12. The information pulses at this point are of short duration and were initially generated by scintillation detector and photomultiplier apparatus 18 in the well logging apparatus. As shown, one side of the primary winding P of transformer T2 is connected to ground and one side of the secondary winding S of the transformer T1 is coupled to ground through a capacitor C1.

Reference number 22 represents a well logging tool, or sonde, in FIG. 1 and, as shown, it contains, in addition to transformers T1 and T2, capacitor C1 and inductor L2, the following, among other things: a Downhole power supply 16; a Detector-Photomultiplier 18; and Downhole Electronics 20. The power supply 16 includes means for converting the 60 cycle AC power received from surface power supply 10 through cable 12 to high voltage DC power which, as shown, is delivered at appropriate voltage levels to the Detector-Photomultiplier 18 and to the Downhole Electronics 20. The Downhole Electronics 20 includes a pre-amp unit and cable pulsing unit which, in turn, drives transformer T1. Also, as shown, the output signals from the Detector-Photomultiplier 18 are fed to the Downhole Electronics unit 20.

Coupled to the receiving end of the cable 12 and in parallel with inductor L1 is an input filter section comprised of a capacitor C2 and an inductor L3; the capacitor C2 and inductor L3 being connected in series as shown. One side of the inductor L3 is connected to one side of a primary winding X of a step-up transformer T3; the other side of the primary winding X being grounded as shown in the drawing. One side of the secondary winding of transformer T3 is also grounded and a diode CR1, which serves to damp the ringing of transformer T3 is connected across the secondary of transformer T3. Connected across the diode CR1 is a potentiometer R1. The potentiometer R1 is used to vary the height of the information pulses. The voltage developed across the potentiometer R1 is capacitively coupled via the capacitor C3 to the grid of a triode Q1. In the triode Q1 the pulse is amplified. A resistor R2 couples the grid and cathode of the tube Q1 and serves to maintain a potential difference between these electrodes. The plate of the triode Q1 is, as shown, coupled to a positive voltage source through a plate resistor R3.

The voltage developed at the plate of the triode Q1 is capacitively coupled via a capacitor C4 to the grid of another triode Q2 which forms part of a cathode follower amplifier. As shown in the schematic drawing the triodes Q1 and Q2 are the first and second stage triodes of a twin triode vacuum tube. As shown, the capacitively coupled voltage pulse delivered to the grid of triode Q2 is developed across the resistor R4 which connects the grid of triode Q2 with ground or the cathode of the triode Q1. The plate of triode Q2 is directly connected to the positive voltage source while the cathode of triode Q2 is connected to a negative voltage source through a resistor R5. A clipping network, or circuit, comprising a diode CR2, resistors R6 and R7 and a potentiometer R8 is provided for clipping the bottom part of the information pulses delivered at the cathode of the triode Q2. As shown, the information pulse is delivered to surface equipment 14 which includes among other things a pulse height analyzer.

Operationally, 60 cycle AC energy from power supply 10 is transmitted through inductor L1, logging cable 12 and inductor L2 to the primary side P of transformer T2. The capacitor C2 presents a high impedance to the 60 cycle AC power supply energy and thus effectively isolates it from transformer T3 and the rest of the circuit. The information pulses are fed to the cable 12 from a secondary side S of transformer T1. The input filter section comprising the serially connected capacitor C2 and inductor L3 presents a very low impedance to the information pulses as compared to the high impedance presented to such pulses by the inductor L1.

Since the information pulses at the surface or receiving end of cable 12 have an attenuated amplitude the step-up transformer T3 boosts their amplitude. On the secondary side of transformer T3 the diode CR1 is connected as shown and it functions to damp the ringing of the step-up transformer. The potentiometer R1 is employed for the purpose of varying the amplitude of the information pulses. This prevents the rather high amplitude pulses generated by some logging apparatus from saturating the amplifier stages following thereby eliminating amplitude discrimination for the channels of information. After leaving the potentiometer R1 the information pulses are capacitor coupled via capacitor C3 to the amplifier Q1 and thence to the cathode follower Q2. The cathode follower eliminates any loading effect on the circuitry when it is connected to the surface equipment 14. On occasion, undesirable noise and reflection pulses appear at the output of the cathode follower. Hence, a clipping circuit is provided. This clipping circuit is comprised of the diode CR2, resistors R6, R7 and a potentiometer R8. The clipping network is used to clip the bottom of the pulses. This allows the noise and reflection pulses to be removed and leaves clean information pulses that are fed into the surface equipment 14.

A practical working embodiment of the circuit shown in the schematic diagram employs the following elements which are to be considered as illustrataive, not limitive, of the invention:

| Element: | Rating/type |
|---|---|
| Capacitor C1 | 1 microfarad. |
| Inductor L2 | 2 mh. |
| Inductor L1 | 2 mh. |
| Capacitor C2 | .02 microfarad. |
| Inductor L3 | 1 mh. |
| Transformer T3 | 1:25 turns ratio. |
| Diode CR1 | Type IN649. |
| Potentiometer R1 | 50K ohms. |
| Capacitor C3 | 0.01 microfarad. |
| Resistor R2 | 500K ohms. |
| Q1 and Q2 | Type 12AT7. |
| Resistor R3 | 30K ohms. |
| Capacitor C4 | 0.01 microfarad. |
| Resistor R4 | 500K ohms. |
| Resistor R5 | 47K ohms. |
| Resistor R6 | 20K ohms. |
| Resistor R7 | 100K ohms. |
| Potentiometer R8 | 50K ohms. |
| Positive voltage source | 150 volts. |
| Negative voltage source | −150 volts. |

The above-rated elements presented a very low impedance at 35.4 kilocycles.

FIG. 2 illustrates the overall operational aspect of the logging system of the invention. As shown, the sonde 22 at the lower end of cable 12 is located within a borehole 24 which traverses different strata, or earth formations. As shown, at the earth's surface the cable 12 is connected to the isolation circuitry 26 hereinbefore described. From isolation circuitry 26 the information pulses are fed to surface equipment 14 and then to a recorder unit 28. In order to correlate the position of the sonde 22 in the borehole 24 during logging there is located at the surface a measuring apparatus 30, represented diagrammatically as a wheel having its perimeter in contact with cable 12, for sensing movement of cable 12 in and out of the borehole 24. Apparatus 30 may be any of the known devices of this type for position determination of sonde 22 in the borehole and may, advantageously, be of the type which provides an electrical output signal transmitted by means of a conductive path 32 to recorder 28 for correlating the recorded logging or information signal with the position of the sonde 22 throughout the logging operation.

While there has been shown and described one more or less specific embodiment of the invention it is to be understood that this has been done for the purpose of illustration only and that the scope of the invention is not to be limited thereby but is to be determined from the appended claims. Further, it is to be understood by those skilled in the art that the present invention is employed in radioactivity borehole logging apparatus including a radiation detector and ancillary equipment including rate meters, recorders, etc.; e.g. such as are disclosed in U.S. Pat. 3,240,938 issued Mar. 15, 1966 to H. E. Hall, Jr.

What is claimed is:

1. A system for logging a borehole traversing earth formations comprising:

a sonde adapted to be passed along the borehole, said sonde including means energizable to generate information signals representative of at least one parameter determined in the borehole;

an A.C. power supply located at the surface of the earth;

a transmission line for transmitting power from said power supply to said means energizable to generate information signals in order to energize same, said transmission line also transmitting said information signals to the surface of the earth;

a first inductive reactance connected in series between the power supply and the transmission line for presenting a high impedance to the information signals and a low impedance to the A.C. power;

a first capacitive reactance and a second inductive reactance connected in series to define a first series circuit;

a step-up transformer having primary and secondary windings;

said first series circuit being connected in series between one side of the primary winding of the step-up transformer and to a junction point between the first inductive reactance and the transmission line;

a first diode connected in parallel with the transformer's secondary winding;

a first potentiometer including a resistance element and a sliding tap, said resistance element being connected in parallel with the first diode;

a second capacitive reactance and a first resistor connected in series to define a second series circuit, said second series circuit being connected in parallel with the first potentiometer such that the sliding tap is connected to the second capacitive reactance and the first resistor is connected to an end of the resistance element;

first and second triodes, each having a plate, grid and cathode;

the grid of the first triode being connected to a junction point between the second capacitance reactance and the first resistor in said second series circuit;

the cathode of the first triode being connected to the first resistor in said second series circuit;

a positive voltage source;

a second resistor connected in series between the positive voltage source and the plate of the first triode;

a third capacitance reactance and a third resistor connected in series to define a third series circuit, said third series circuit being connected in parallel with the plate and cathode of the first triode such that the plate thereof is connected to the third capacitive reactance and the cathode thereof is connected to the third resistor;

the grid of the second triode being connected to a junction point between the third resistor and third capacitive reactance in said third series circuit;

the plate of the second triode being connected to positive voltage source;

a negative voltage source;

a fourth resistor connected in series between the negative voltage source and the cathode of the second triode;

a second diode and fifth resistor connected in series to define a fourth series circuit;

a sixth resistor and a second potentiometer connected in series to define a fifth series circuit, said second potentiometer including a resistance element and sliding tap;

said sixth resistor being connected to the positive voltage source;

the fourth series circuit being connected between the cathode of the second triode and the sliding tap of the second potentiometer, with the second diode connected to the second triode's cathode and the fifth resistor connected to the sliding tap of the second potentiometer; and means coupled to a junction point between the second diode and fifth resistor for recording information signals correlated with the depth of the sonde in the borehole.

References Cited
UNITED STATES PATENTS 2,957,083  10/1960  Scherbatskoy _____ 250—83.3
3,368,196  2/1968  Mazzagatti et al. _____ 340—18

RICHARD A. FARLEY, Primary Examiner

D. C. KAUFMAN, Assistant Examiner

U.S. Cl. X.R.
250—83.3, 83.6